April 25, 1967  D. J. MARSHALL  3,315,366
OUT OF ROUND GAUGE ATTACHMENT FOR A WHEEL BALANCING STAND
Filed April 9, 1965  2 Sheets-Sheet 1
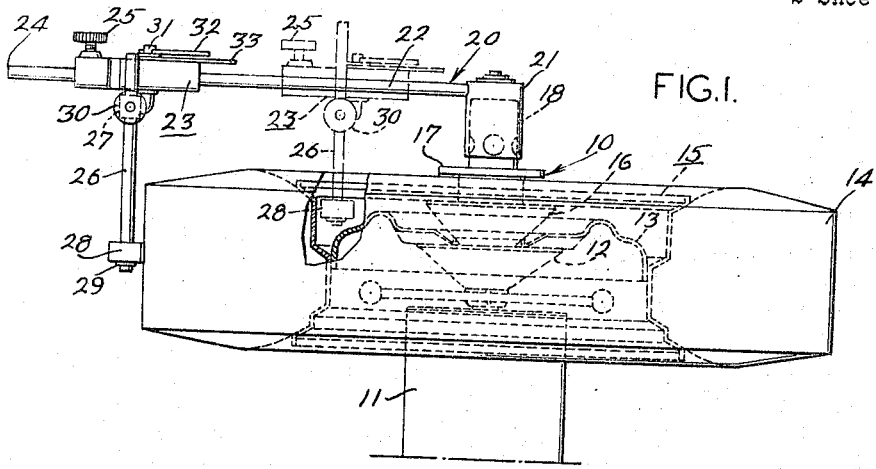
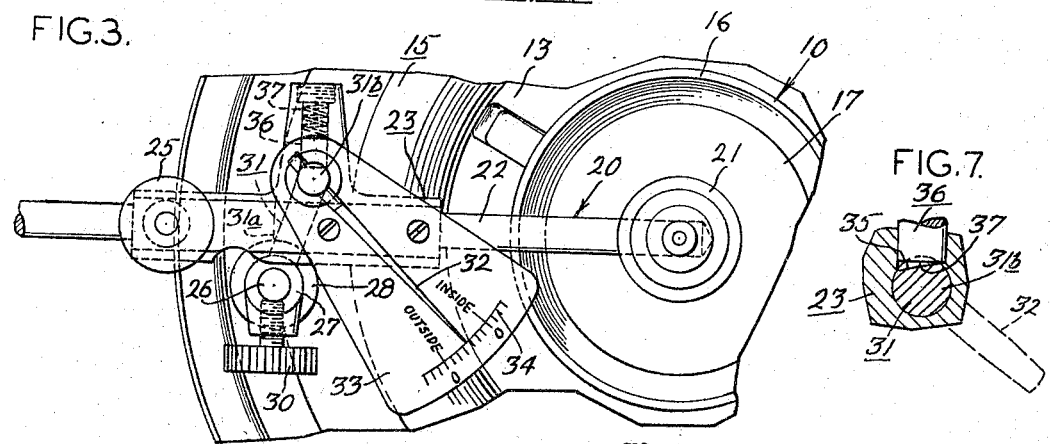
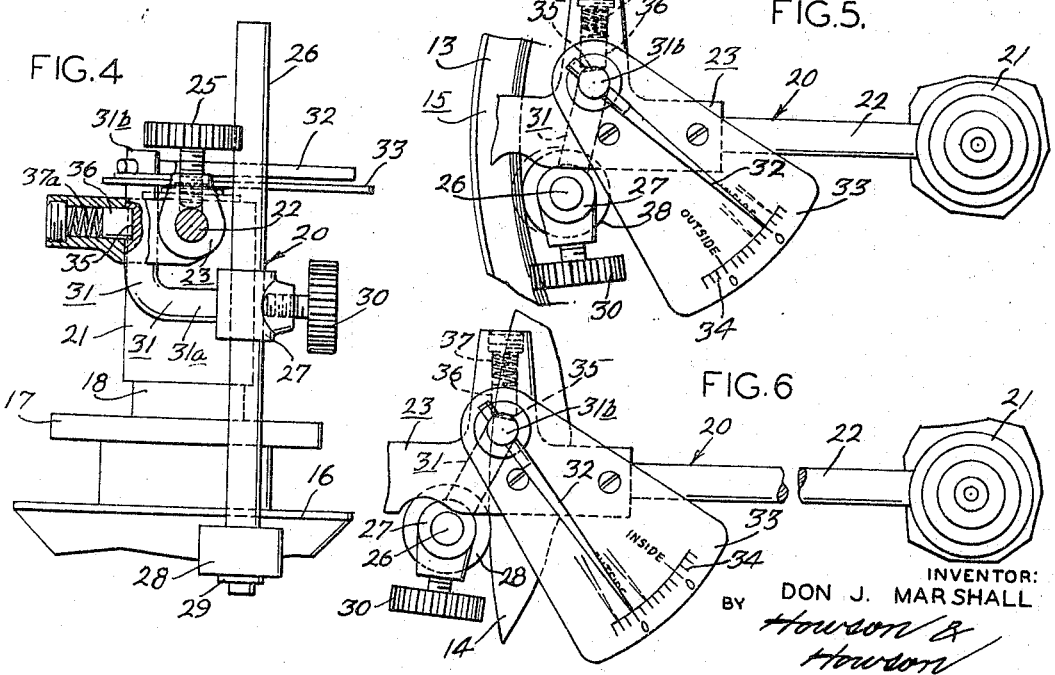
INVENTOR:
DON J. MARSHALL
BY Howson & Howson
ATTYS.

INVENTOR:
DON J. MARSHALL
BY Howson & Howson
ATTYS.

United States Patent Office 3,315,366
Patented Apr. 25, 1967

3,315,366
OUT OF ROUND GAUGE ATTACHMENT
FOR A WHEEL BALANCING STAND
Don J. Marshall, Edgewater, Md., assignor to Goodall Sem-Metallic Hose & Mfg. Co., Philadelphia, Pa., a corporation of Pennsylvania
Filed Apr. 9, 1965, Ser. No. 447,032
2 Claims. (Cl. 33—172)

The present invention relates to measuring devices, and more particularly to an attachment for detecting out of round conditions existing in a rim, and/or tire and rim assembly mounted on a wheel balancing stand. The attachment of the present invention has particular application for use in conjunction with the device of a copending patent application "Wheel Balancing Stand," S.N. 437,219, filed on Mar. 4, 1965.

As is well known to persons skilled in the art of motor vehicle maintenance, serious vibration and road pounding forces result in excess wear of both tire and spring suspension systems. Further, these vibrations and forces cause inordinate driver fatigue, both the wear and the fatigue leading to highway accidents. It has been found that the serious vibration and road pounding results not only from wheel (tire and rim) static and dynamic imbalance, but also due to any eccentricity of the running periphery of the tire about its rotational axis. Thus it is apparent that to balance only the rotating mass of the tire-rim assembly about its rotational axis corrects only one of the causes of the vibration and pounding conditions.

The prior art has provided out-of-round, sometimes referred to as run-out, gauges as separate machines, requiring loss of time and expensive labor in their use. However, except in the instance of a very few, highly expensive dynamic balancers, no attempt has been made to provide a device for use in conjunction with static balancers for measurement of eccentricity in the running periphery of a tire. Further, dynamic balancers equipped with run-out gauges due to their complex design, are priced normally above the range of the average service station and the station is therefore not financially able to provide the quality of service necessary to discover any eccentricity in the running periphery of the tire and rim combination.

While the device of the present invention does not provide nor suggest a cure for any out-of-roundness detected through its use, it does protect the car owner against the purchase of improperly manufactured tires, new or retreaded, and thus contributes to the personal safety as well as financial protection of the car owner. In addition, the device of the present invention affords protection for the service station attendant against call backs, a situation oftentimes encountered where a customer whose tires have been properly statically balanced returns again and again complaining of continued vibrations which are caused by peripheral eccentricity rather than imbalance. It is hoped that with the discovery of eccentricity in a tire, that such tire will be returned to the manufacturer to become an economic force assuring the motoring public protection against the marketing of inferior tires.

In view of the above, it is a principal object of the present invention to provide an attachment for a wheel balancing stand which will permit the measurement of any eccentricity in the running periphery of the rim, and/or tire and rim combination about the rotational axis of the wheel.

Another object of the present invention is to provide a low cost out of round gauge to protect the motoring public with regard to the safe performance of vehicle tires, and to add substantially thereby to the useful life of the tires and the spring suspension on which the tires are installed.

Still another object of the present invention is to provide an out of round gauge that may be easily attached and detached to a wheel stand.

Another object of the invention is to provide a measuring device which will detect out of round conditions in either the tire or the rim by effecting a simple adjustment of the device and without the necessity of further handling of the tire-rim assembly.

Another object of the present invention is to provide an out of round measuring gauge of simple and yet rugged construction, the use of which may be easily understood, and capable of withstanding the degree of abuse normally associated with tire maintenance shops.

Other objects and a fuller understanding of the invention may be had by referring to the following description and claims taken in conjunction with the accompanying drawings in which:

FIG. 1 is a fragmentary side elevational view of a wheel stand having mounted thereon a wheel and an attachment constructed in accordance with the present invention;

FIG. 3 is a fragmentary plan view of a portion of the device illustrated in FIG. 2 and taken along line 3—3 thereof;

FIG. 4 is a fragmentary sectional view taken along line 4—4 of FIG. 2;

FIGS. 5 and 6 are views of the device similar to that illustrated in FIG. 3 but with the indicator associated therewith in a different position; and FIG. 7 is an enlarged fragmentary view of a portion of the device illustrated in FIGS. 1-6.

Figure 2:
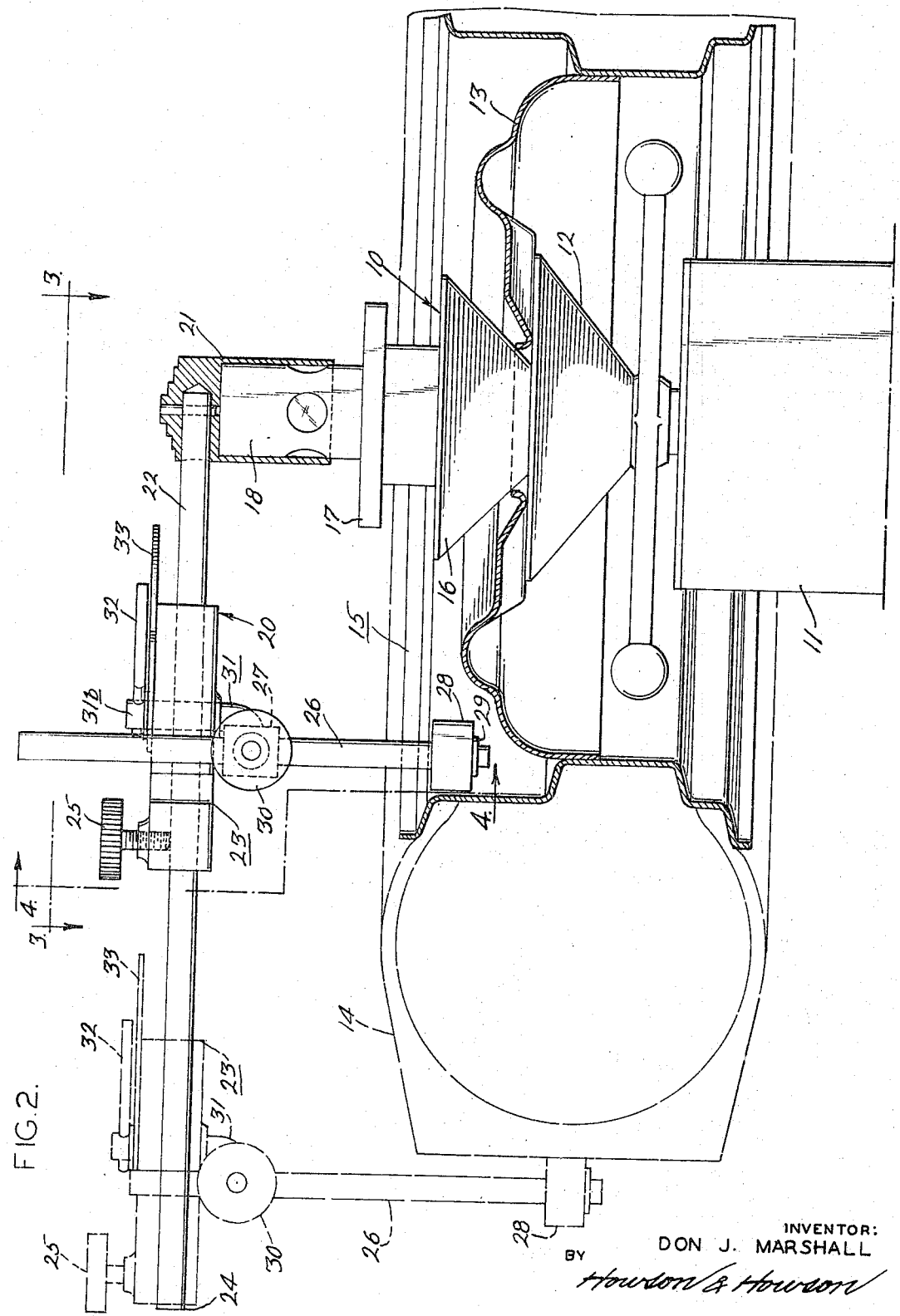
FIG. 2 is an enlarged fragmentary side elevational view of the apparatus illustrated in FIG. 1 and showing the attachment of the present invention in a different position.

Referring now to the drawings, and especially FIGS. 1 and 2 thereof, a wheel balancing stand 10 comprising a support tube or frame 11 is supported by a base (not shown). On top of the frame 11 is wheel engagement means 12 for supporting a rim 13 of a wheel 15, and having a tire 14 peripherally mounted on the rim 13. Above the wheel engaging means 12 is a locking centering cone 16 for securing the rim 13 to the wheel engaging means 12 while simultaneously centering the rim relative to the engagement means. Operable in conjunction with the locking centering cone 16 is a lock actuator 17 for securing the centering cone to the rim 13 and the wheel engagement means 12. A cylindrical wheel balancing indicator 18 is mounted on the stand 10 to determine errors in the static balance of the wheel mounted thereon. A more detailed description of the particular wheel balancing stand used in conjunction with the apparatus of the present invention is set forth in the Marshall application entitled "Wheel Balancing Stand," Ser. No. 437,218, on Mar. 4, 1965.

In accordance with the invention, an out of round gauge attachment 20 is mounted preferably along the axis of rotation of the wheel balancing stand 10 to enable relative rotation of the wheel 15 to the gauge to enable quick determination of any eccentricity of both the tire and rim combination and of the rim 13 itself. To this end, the gauge 20 comprises a tire stand connecting means, in the present instance a pivotably mounted tubular socket 21 insertable over and engageable with the static wheel balancing indicator 18. Projecting radially outwardly from the socket 21 is a swing arm 22 mounting thereon a slidable frame 23 movable between the socket 21 and the extended terminus 24 of the swing arm 22. Slide frame lock means, in the present instance comprising a threaded lock wheel 25, serves to secure the frame 23 at any desired point along the swing arm 22.

In order to permit detection and measurement of eccentricity, a vertically slidable bar 26, connected to a sleeve 27 which is connected to the frame 23, has a coaxially mounted rotatable sensing wheel 28 mounted on the bar 26 and retained at the lower end thereof by a retainer 29. Bar lock means, in the present instance a locking handwheel 30, permits the adjustment of the bar in the vertical plane relative to the sleeve 27. The sleeve 27 is connected through a deflection arm 31, in the present instance the deflection arm being L-shaped and having a laterally extending portion 31a as well as an upright portion 31b. As illustrated in FIG. 4 the upright portion 31b is rotatably connected in the slide frame 23, the terminal end being connected to a pointer indicator 32 superimposed of an indicator face 33 having suitable indicia 34 on the upper portion thereof. In this manner, radial movement of the sensing wheel 28 is reflected through the deflection arm 31 and causes movement of the pointer indicator 32 relative to the indicator face 33.

As it is desirable to enable readings of both low and high spots relative to a fixed norm, biasing means are mounted on the frame engageable with the deflection arm 31 to impede the free rotation of the deflection arm on either side of a neutral position and to move the arm and thus the sensing wheel back to its neutral and preset position. To this end, and as best illustrated in FIGS. 4 and 7, the upright portion 31b of the deflection arm 31 is provided with a camming surface 35 registerable with a cam follower 36, which cam follower is biased into engagement with the camming surface 35 by a spring 37a. Preferably, the camming surface 35 is flat as is the cam surface 37 of the cam follower 36. Thus when the camming surface 35 engages the camming surface 37, the pointer indicator 32 lies substantially in a neutral position relative to the indicator face 33. This position is indicated in FIG. 3.

In operation, after a wheel 15 has been mounted on the wheel balancing stand 10 and secured thereto by means of the locking centering cone 16 and its associated lock actuator 17, the socket 21 of the gauge 20 is placed on the indicator 18. The slide frame 23 is then moved radially outward along the swing arm 22 and the sensing wheel 28 is moved into position adjacent the periphery of the tire via the slidable bar 26 and locked from further vertical movement by the lock wheel 30. The sensing wheel is then brought into engagement with the periphery of the tire by movement of the slide frame 23 along the arm 22 and until the pointer indicator 32, via the deflection arm 31, coincides with the indicia labelled "outside." (See FIG. 6.) As may be noted in FIG. 6, the camming surface 35 is thus cocked with respect to the surface 37 of the cam follower 36 and movement of the sensing wheel radially inward or outward, with respect to the central axis of the tire-rim combination, will be reflected by the biasing force and indicated by the pointer indicator 32.

If eccentricity is noted upon reading the tire and rim combination, it is desirable to determine whether or not the eccentricity is due to the tire 14 alone or due to an imperfection in the rim 13. To this end, any eccentricity in the rim may be detected by moving the sensing wheel into engagement with the inner periphery of the rim 13. This is accomplished in the same manner as heretofore described relative to engagement of the sensing wheel 28 with the outer periphery of the tire 14. After engagement of the sensing wheel 28 with the inner periphery of the rim, as illustrated in FIG. 2, the frame 23 is moved radially outward until the pointer indicator 32 coincides with the indicia on the indicator face 33 labelled "inside." Thus the camming surface 35 becomes cocked with respect to the camming surface 37 of the cam follower 36, whereby relative rotation permits the pointer to indicate eccentricity of the rim. (See FIGS. 5 and 7.)

Thus the out of round gauge of the present invention provides an easy means for determining eccentricity in the running periphery of a tire about its rotational axis thereby permitting easy detection of this type of deficiency and alleviating excessive wear due to imperfect tires and the safety hazard resulting therefrom.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. An out of round gauge attachment for a wheel balancing stand comprising in combination: a pivotal tire stand connecting means connectable to said tire stand along the pivot axis thereof; a radially extending swing arm projecting from said connecting means; a slide frame slidably mounted on said arm and movable between said connecting means and the extended terminus of said arm; means to lock said frame relative to said arm; a deflection arm rotatably connected at one end to said frame and at the other end to a sleeve; a depending, vertically slidable bar mounted in said sleeve; and means to secure said bar to said sleeve; a rotatable sensing wheel mounted coaxially along said bar and means to retain said wheel on said bar; a spring biased cam follower mounted in said frame, and a plane surface cam portion on said deflection arm registrable with said cam follower, said cam follower and said cam portion operative to impede the free rotation of said deflection arm and to cause said arm to move towards a neutral position upon rotation in either direction therefrom; an indicator-pointer member and an indicator face member, said face member having indicia inscribed thereon, one of said members connected to said deflection arm and the other of said members mounted on said frame, said members positioned relative to each other to thereby indicate rotational movement of said deflection arm.

2. An out of round gauge attachment for a tire balancing stand in accordance with claim 1 wherein said tire balancing stand has on the upper portion thereof a cylindrical wheel balancing indicator, and wherein said tire stand connecting means comprises a tubular socket insertable over and rotatable with respect to said wheel balancing indicator.

References Cited by the Examiner

UNITED STATES PATENTS

| 293,768 | 2/1884 | Munton | 33—203.19 |
| 1,436,111 | 11/1922 | Reich | 33—172 |
| 2,613,447 | 10/1952 | Brouwer | 33—172 X |

LEONARD FORMAN, *Primary Examiner.*

J. M. FREED, *Assistant Examiner.*